United States Patent
Yoo et al.

(10) Patent No.: US 10,492,106 B1
(45) Date of Patent: Nov. 26, 2019

(54) ADAPTIVE DATA RATE CONTROL METHOD AND ADAPTIVE DATA RATE CONTROL SYSTEM

(71) Applicant: Pusan National University Industry-University Cooperation Foundation, Busan (KR)

(72) Inventors: Young-Hwan Yoo, Busan (KR); Sungryul Kim, Yangsan-si (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 16/367,249

(22) Filed: Mar. 28, 2019

(30) Foreign Application Priority Data

Aug. 6, 2018 (KR) .......................... 10-2018-0091185

(51) Int. Cl.
| | |
|---|---|
| *H04W 28/22* | (2009.01) |
| *H04W 88/16* | (2009.01) |
| *H04B 17/336* | (2015.01) |
| *H04W 24/10* | (2009.01) |

(52) U.S. Cl.
CPC .......... *H04W 28/22* (2013.01); *H04B 17/336* (2015.01); *H04W 24/10* (2013.01); *H04W 88/16* (2013.01)

(58) Field of Classification Search
None
See application file for complete search history.

(56) References Cited

U.S. PATENT DOCUMENTS

| 10,079,769 B1 * | 9/2018 | Frink ...................... H04L 47/25 |
| 2007/0093282 A1 * | 4/2007 | Chang .................. H04B 7/0608 |
| | | 455/575.7 |
| 2016/0261306 A1 * | 9/2016 | Seller ................. H04W 56/0015 |
| 2016/0294505 A1 * | 10/2016 | Turner ................... H04L 1/0002 |
| 2018/0294833 A1 * | 10/2018 | Rose ......................... H04B 1/44 |
| 2018/0314615 A1 * | 11/2018 | Gay ..................... G06F 11/3093 |
| 2019/0188899 A1 * | 6/2019 | Moloney ................ G01C 21/20 |

FOREIGN PATENT DOCUMENTS

| KR | 100867990 B1 | 11/2008 |
| KR | 100956408 B1 | 5/2010 |
| KR | 101378460 B1 | 3/2014 |
| KR | 101742443 B1 | 5/2017 |
| KR | 101837684 B1 | 3/2018 |

\* cited by examiner

*Primary Examiner* — Phirin Sam
(74) *Attorney, Agent, or Firm* — Cantor Colburn LLP

(57) ABSTRACT

Provided are an adaptive data rate control method and an adaptive data rate control system. The adaptive data rate control method may include collecting a data rate used by each of terminals connected to a network through a gateway; counting the number of terminals for each section of the data rate; comparing the counted number of terminals for each section to the optimal number of terminals that are allocated to a corresponding section based on an overall network throughput; determining a terminal included in a mismatch section as a result of the comparing as a target terminal of which the data rate is to be controlled; and transmitting a command packet for controlling the data rate to the target terminal through the gateway.

14 Claims, 6 Drawing Sheets

ADAPTIVE DATA RATE CONTROL METHOD AND ADAPTIVE DATA RATE CONTROL SYSTEM

CROSS-REFERENCE TO RELATED APPLICATION(S)

This application claims the priority benefit of Korean Patent Application No. 10-2018-0091185 filed on Aug. 6, 2018, in the Korean Intellectual Property Office, the disclosure of which is incorporated herein by reference for all purposes.

BACKGROUND

1. Field

One or more example embodiments relate to an adaptive data rate control method and an adaptive data rate control system for maximizing an overall network throughput based on a collision probability in a LoRa network environment.

2. Description of Related Art

Currently, the Internet of things (IoT) that exchanges data through machine-to-machine (M2M) communication without a human intervention has been commercialized. Accordingly, there is an increasing interest in the LoRa network that is a wireless communication network capable of making far distance communication with low power between terminals without using large infrastructure construction cost.

Terminals in a LoRa network periodically transmit data to a gateway. The gateway manages a state of each terminal based on data transmitted from each terminal and transmits data to a server that provides an application service.

In the LoRa network, a data rate used by each terminal is controlled based on connection quality, for example, a link state, of each terminal. Therefore, when terminals using the same data rate attempt to transmit data at the same time, a collision may occur between the terminals.

For example, although all of 100 terminals have excellent connection quality, the 100 terminals may be controlled to use the same high data rate. In this case, an inter-terminal collision may occur.

In the LoRa network according to the related art, in response to an increase in the number of terminals using the same data rate through data rate control, a collision probability may also increase accordingly, which may lead to degrading an overall network throughput.

Also, in the LoRa network according to the related art, a data rate may be adjusted by considering only connection quality of each individual terminal. Accordingly, a collision probability with another terminal in the network that varies due to such data rate control is not considered.

As technology for complementing a collision in the LoRa network according to the related art, proposed is, for example, a 'packet collision avoidance method' that may prevent a collision from occurring in a unlicensed band by selecting a time and a channel for transmitting LoRa data based on a channel interference amount detected through channel sensing with respect to a plurality of channels corresponding to the unlicensed band. However, in such related art, controlling a data rate by dispersing data rates based on a collision probability varying through the data rate control is not considered.

Accordingly, there is a need for technology for optimally controlling a data rate of a terminal to increase an overall network throughput by considering a collision probability based on the number of terminals using the same data rate with respect to the entire terminals in a network.

SUMMARY

At least one example embodiment is to collect information of the entire terminals deployed in a LoRa network and to control a data rate of a terminal to maximize an overall network throughput considering the possible collision between terminals using the same data rate.

At least one example embodiment is to increase a data rate within the optimal number of terminals for each section allocated to maximize an overall network throughput based on a collision probability.

At least one example embodiment is to determine a target terminal of which a data rate is to be controlled based on a data rate required by each terminal or a statistical value of a signal-to-noise ratio (SNR) and to control a data rate of a terminal based on the overall network information, for example, connection quality, for example, a link state, of each terminal and an application service provided to each terminal.

According to an aspect of at least one example embodiment, there is provided an adaptive data rate control method including collecting a data rate used by each of terminals connected to a network through a gateway; counting the number of terminals for each section of the data rate; comparing the counted number of terminals for each section to the optimal number of terminals that are allocated to a corresponding section based on an overall network throughput; determining a terminal included in a mismatch section as a result of the comparing, as a target terminal of which the data rate is to be controlled; and transmitting a command packet for controlling the data rate to the target terminal through the gateway.

According to an aspect of at least one example embodiment, there is provided an adaptive data rate control system including a collector configured to collect a data rate used by each of terminals connected to a network through a gateway; a counter configured to count the number of terminals for each section of the data rate, and to compare the counted number of terminals for each section to the optimal number of terminals that are allocated to a corresponding section based on an overall network throughput; and a processing configured to determine a terminal included in a mismatch section as a result of the comparing, as a target terminal of which the data rate is to be controlled, and to transmit a command packet for controlling the data rate to the target terminal through the gateway.

According to some example embodiments, it is possible to optimize a data rate of each terminal to enhance an overall network throughput based on a collision probability by verifying the number of terminals using the same data rate with respect to the entire terminals in a network.

Also, according to some example embodiments, it is possible to increase a data rate within the optimal number of terminals for each section allocated to maximize an overall network throughput by considering a collision probability based on an optimization scheme, based on terminal information collected through a gateway. Through this, it is possible to prevent a collision from occurring due to the data rate control.

Also, according to some example embodiments, it is possible to determine a target terminal of which a data rate is to be controlled based on a data rate required by each terminal or a statistical value of an SNR and to control a data rate of a terminal based on the overall network information, for example, connection quality, for example, a link state, of each terminal and an application service provided to each terminal Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms used herein are to describe the example embodiments and are not construed as limiting. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

An adaptive data rate control system (also, referred to as a data rate control system) according to an example embodiment may optimize a data rate within the "optimal number of terminals for each section of the data rate" by setting one of an "overall network throughput" and a "collision probability according to the number of terminals using the same data rate" as an objective function and by deriving the "optimal number of terminals for each section" to accomplish the objective function using an optimization scheme.

For example, when the "collision probability" is set as the objective function, the data rate control system may derive the optimal number of terminals for each section of the data rate capable of minimizing the collision probability based on the overall network throughput and may control a data rate within the optimal number of terminals.

Also, when the "overall network throughput" is set as the objective function, the data rate control system may derive the optimal number of terminals for each section capable of maximizing the overall network throughput based on the collision probability and may control a data rate within the optimal number of terminals.

That is, the data rate control system may set a factor with a relatively high system importance as the objective function, may derive the optimal number of terminals for each section to accomplish the objective function using an optimization scheme, and may control the data rate.

Hereinafter, an example embodiment of setting the overall network throughput as the objective function and controlling the data rate to increase the overall network throughput based on the collision probability will be described.

Figure 1:
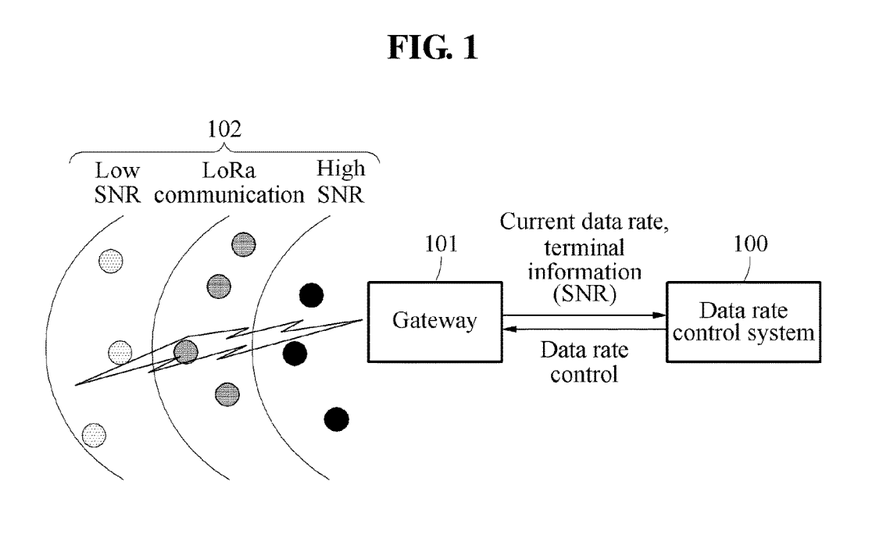
FIG. 1 illustrates an example of a network connection relationship among an adaptive data rate control system, a gateway, and a terminal according to an example embodiment.

FIG. 1 illustrates an example of a network connection relationship among an adaptive data rate control system, a gateway, and a terminal according to an example embodiment.

Referring to FIG. 1, a data rate control system 100 may be connected to a terminal 102 and a LoRa network through a gateway 101, may collect a variety of data sensed by the terminal 102 and may provide various types of application services.

The data rate control system 100 may be included in a server that provides an application service, may be included in the gateway 101, and may be included in a network device that connects the gateway 101 and another gateway.

The terminal 102 may be, for example, a sensor terminal configured to periodically transmit sensing data to the gateway 101 that is connected based on a LoRa network.

For example, the terminal 102 may be a water meter, a gas meter, a card terminal of a vending machine, a pet tracking device, a smoke alarm, a trash container detector, and the like.

The term "data rate" used herein refers to a bit rate at which the terminal 102 transmits sensing data to the gateway 101 per second and may be designated for each terminal 102.

Once a signal including such data is transmitted from the terminal 102, the gateway 101 may identify a data rate that is currently being used by the terminal 102, that is, a current data rate of the terminal 102 from a packet header in the data, may measure a signal-to-noise ratio (SNR) of the signal, and may evaluate connection quality, for example, a link state, of the terminal 102 based on the measured SNR.

In general, if there is no obstacle between the gateway 101 and the terminal 102, the gateway 101 may evaluate the connection quality as being relatively excellent according to an increase in the SNR and may evaluate the connection quality as being relatively poor according to a decrease in the SNR.

The data rate control system 100 may collect terminal information that includes at least one of the SNR and the connection quality of the terminal 102, the current data rate of the terminal 102, and the number of terminals 102 present within communication coverage of the gateway 101 through the gateway 101 and may maintain the collected terminal information in a database.

The data rate control system 100 may derive an optimal combination for the number of terminals using a specific data rate to maximize an overall throughput of the LoRa network by applying the optimization scheme based on the terminal information that is maintained in the database.

That is, the data rate control system 100 may derive a combination between the data rate and the number of terminals to maximize the overall throughput by considering a collision probability based on the number of terminals using the same data rate and may allocate the optimal number of terminals for each section corresponding to the data rate based on the combination.

For example, to increase the overall network throughput by 10%, the data rate control system 100 may derive an optimal combination in which the number of terminals using a data rate of 1 is 5 and the number of terminals using a data rate of 2 is 3, based on the collision probability.

The data rate control system 100 may enhance the overall network throughput and may prevent a collision from occurring between terminals using the same data rate by increasing a data rate of each terminal 102 within the optimal number of terminals through the gateway 101.

For example, when two terminals 102 are using the data rate of 1 and five terminals 102 are using the data rate of 2, the data rate control system 100 may intend to increase the overall network throughput by increasing the data rate of terminals 102 using the data rate 2. In this case, not to exceed the optimal number, '5', of terminals 102 allocated to the data rate of 1, the data rate control system 100 may select only three terminals 102 from among the five terminals 102 corresponding to the data rate of 2 and control the selected three terminals 102 to use the data rate of 1.

As described above, according to example embodiments, it is possible to appropriately control a data rate of each terminal to maximize an overall network throughput by considering a collision probability between terminals using the same data rate with respect to the entire terminals in a network.

Figure 2:
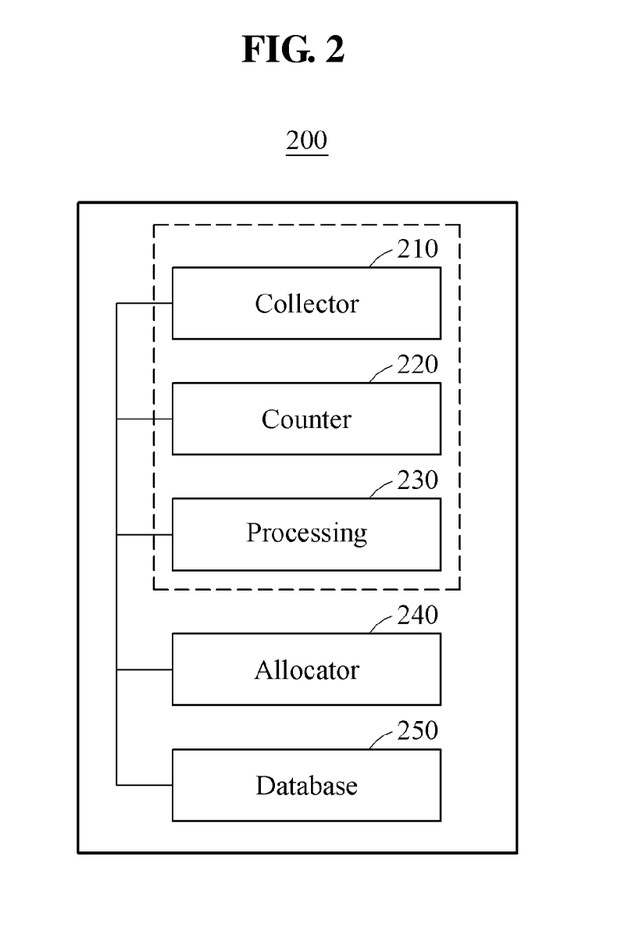
FIG. 2 is a block diagram illustrating an example of an adaptive data rate control system according to an example embodiment.

FIG. 2 is a block diagram illustrating an example of an adaptive data rate control system according to an example embodiment.

Referring to FIG. 2, a data rate control system 200 includes a collector 210, a counter 220, and a processing 230. Depending on example embodiments, the data rate control system 200 may further include an allocator 240 and a database 250.

The collector 210 collects a data rate used by each of terminals connected to a network through a gateway.

Here, the terminal may be a sensor terminal configured to periodically transmit sensing data to the gateway connected to a LoRa network. The collector 210 may collect a current data rate of each terminal from a packet header in data that is transmitted from each terminal to the gateway.

Here, the data rate may refer to a processing rate at which each terminal transmits sensing data to the gateway connected to the LoRa network. A different data rate may be designated for each terminal.

The collector 210 may measure an SNR of a signal transmitted from each terminal through the gateway and may maintain the current data rate and information, for example, an available data rate range and connection quality, which is analyzed based on a statistical value of the SNR, in the database 250 as terminal information. Here, the statistical value of the SNR may be an average SNR measured during a desired period of time.

In detail, the collector 210 may assign the available data rate range to each terminal based on the statistical value of the SNR.

For example, the collector 210 may assign, as the available data rate range, a highest data rate and a lowest data rate among assignable data rates with respect to a terminal having the statistical value of the SNR greater than a reference value. Also, the collector 210 may assign, as the available data rate range, the lowest data rate among the assignable data rates with respect to a terminal having the statistical value of the SNR less than the reference value.

Also, the collector 210 may evaluate the connection quality between each terminal and the gateway based on the statistical value of the SNR.

For example, the collector 210 may evaluate that connection quality of a terminal having a relatively high SNR is excellent, for example, stable, good, and high, and may evaluate that connection quality of a terminal having a relatively low SNR is not excellent, for example, unstable, poor, and low. In this manner, the collector 210 may verify a link state of an individual terminal depending on whether the measured SNR is high or low.

The collector 210 may maintain, in the database 250, terminal information that includes at least one of the current data rate, the statistical value of the SNR, the available data range and connection quality, for example, a link state, of each terminal, and the number of terminals present within communication coverage of the gateway.

Depending on example embodiments, the data rate control system 200 may further include the allocator 240.

The allocator 240 drives a combination for the number of terminals using a specific section of the data rate among a plurality of sections to maximize an overall network throughput based on an optimization scheme, based on the terminal information maintained in the database 250, and allocates the optimal number of terminals for each section based on the combination.

That is, the allocator 240 may derive a combination for the optimal number of terminals using a specific data rate by applying the optimization scheme to maximize the overall network throughput by considering a collision between terminals using the same data rate based on terminal information that includes at least one of the current data rates, the SNR, the connection quality, and the available data rate range with respect to the entire terminals deployed in the LoRa network, and may allocate the optimal number of terminals for each section corresponding to the data rate based on the derived combination.

Here, the allocator 240 may derive the combination for the number of terminals using the specific section to maximize the network throughput by defining the overall network throughput as an objective function for the number of terminals using the specific section and by applying at least one of a Lagrange multiplier method, a slope descent method, and a dual problem and descent projection method as the optimization scheme.

For example, to increase the overall network throughput by 10%, the allocator 240 may derive an optimal combination in which the number of terminals using a data rate of 1 is 5 and the number of terminals using a data rate of 2 is 3, based on the collision probability, and may allocate the optimal number of terminals for each section based on the derived optimal combination.

That is, the optimal number of terminals for each section may indicate the number of terminals for each section in the case of maximizing the overall network throughput by considering the collision probability based on the number of terminals simultaneously using a corresponding section.

For example, the allocator 240 may predict a concentrated data rate at which the number of terminals to which the same data rate is designated exceeds, that is, is greater than a reference value, for example, half, in the case of designating a data rate higher than a current data rate to each terminal in descending order of SNRs or connection qualities of the entire terminals connected to the LoRa network, may select a portion of the terminals to which the concentrated data rate is designated in descending order of a required data rate or in descending order of SNR or connection quality, and may allocate the optimal number of terminals for each section by adding up the number of terminals for each section corresponding to each data rate in the case of designating the selected portion of terminals to use a data rate higher than the current data rate.

As another example, the allocator 240 may repeat a process of counting the number of terminals for each data rate in the case of designating a highest data rate in the available data rate range with respect to the entire terminals present in the network, verifying a concentrated data rate that is designated to at least a half of the entire terminals, and designating a terminal having a lowest SNR or connection quality among the terminals to which the concentrated data rate is designated to use a data rate less than the highest data rate, until the number of terminals to which the concentrated data rate is designated decreases to be less than a half, and may allocate the optimal number of terminals for each section by adding up the number of terminals designated for each section corresponding to each data rate.

Accordingly, the data rate control system 200 may control a data rate of a terminal based on the optimal number of terminals for each section to maximize the overall network throughput by considering connection quality of each terminal and a collision probability based on the number of terminals using the same data rate among the entire terminals present in the network, and thereby may prevent a collision from occurring due to such an increase in a data rate.

The counter 220 counts the number of terminals for each section of the data rate and compares the counted number of terminals for each section to the optimal number of terminals that are allocated to a corresponding section based on the overall network throughput.

That is, the counter 220 may count the number of terminals for each section based on a current data rate with respect to the entire terminals connected to the network through a single gateway, and may compare the counted number of terminals to the optimal number of terminals for each section to maximize the overall network throughput based on a collision. The processing 230 determines a terminal included in a mismatch section as a result of the comparing, as a target terminal of which the data rate is to be controlled, and transmits a command packet for controlling the data rate to the target terminal through the gateway.

That is, to control the target terminal to increase the data rate for enhancement in the overall network throughput, the processing 230 may transmit the command packet that includes a changed data rate and an identification number of the target terminal to the gateway. In response to the command packet, the gateway may control the data rate used by each target terminal based on the changed data rate.

For example, when current data rates of two terminals belong to a first section and current data rates of remaining five terminals belong to a second section among seven terminals connected to the LoRa network through the gateway, the counter 220 may count the number of terminals corresponding to the first section as '2' and may count the number of terminals corresponding to the second section as '5' and may compare '2' and '5' to the optimal number of terminals, for example, '4', for the first section and the optimal number of terminals, for example, '3', for the second section, respectively.

Here, since the number of terminals, '2', corresponding to the first section is less than the number of optimal terminals, '4', for the first section, however, the number of terminals, '5', corresponding to the second section is greater than the optimal number of terminals, '3', for the second section, and all of the five terminals corresponding to the second section may use the first section, the processing 230 may determine the five terminals using the second section as target terminals of which the data rates are to be controlled as the first section.

For example, when the number of terminals counted in the first section among a plurality of sections is less by n than the optimal number of terminals allocated to the first section, the processing 230 may select the number of terminals including the first section as an available data rate range from among the number of terminals counted in the second section of which the data rate is less than that of the first section and may determine the n or less number of terminals among the selected terminals as the target terminal. Here, n denotes a natural number of 1 or more.

Also, the processing 230 may transmit a command packet for increasing a data rate of the target terminal to be an average data rate of terminals included in the first section. Alternatively, the processing 230 may transmit the command packet for increasing the data rate to be a highest data rate in the first section.

Figure 3:
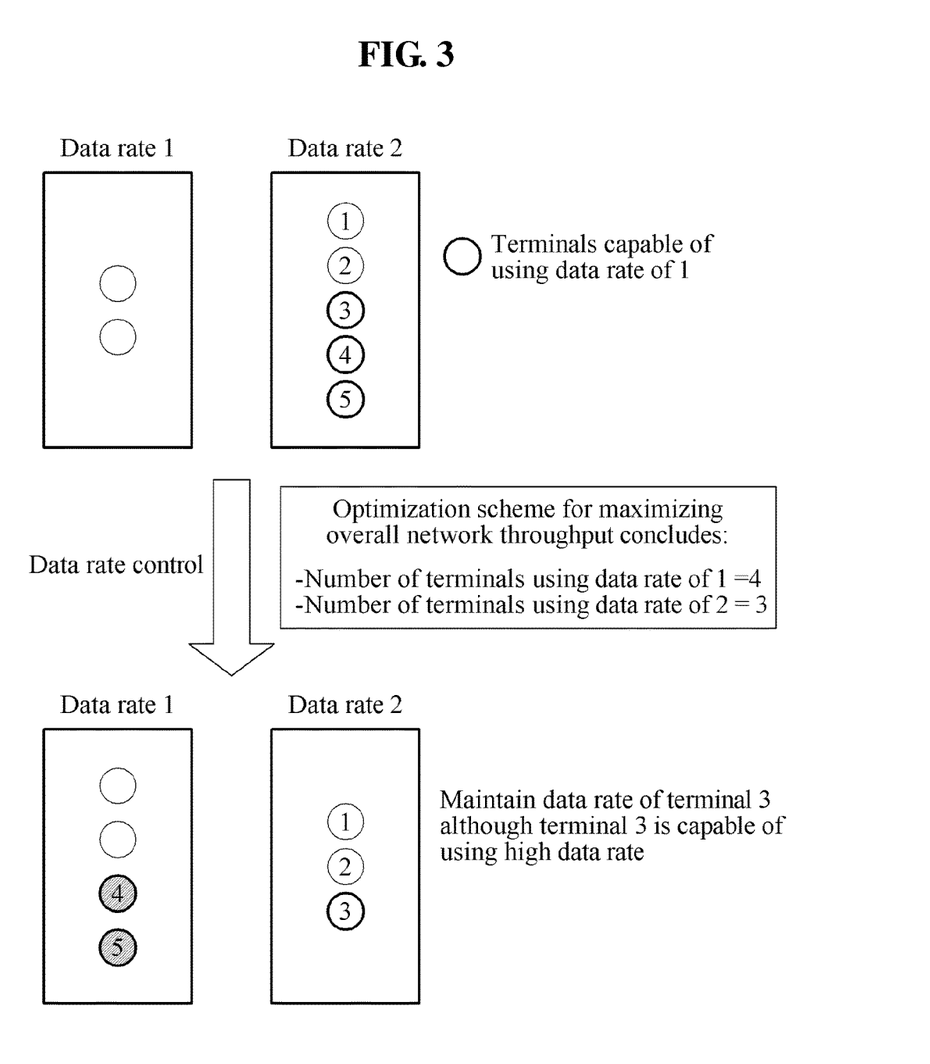
FIG. 3 illustrates an example of controlling a data rate in an adaptive data rate control system according to an example embodiment.

For example, referring to FIG. 3, with respect to all of the seven terminals connected to the LoRa network, the allocator 240 may allocate the optimal number of terminals for each section to maximize the collision-based overall network throughput based on an optimization scheme, as '4' for the first section (data rate of 1) and '3' for the second section (data rate of 2). The processing 230 may control the data rate of each terminal within the optimal number of terminals for each section.

Since the number of terminals ('2') of the first section (data rate of 1) is less by '2' than the optimal number of terminals ('4') of the first section, the processing 230 may determine a maximum of two target terminals among terminals using the second section (data rate of 2) of which the data rate is less than that of the first section.

Here, the processing 230 may select a target terminal from among terminals that include the first section in the available data rate range.

Also, when a plurality of second sections is present, the processing 230 may select, from among the plurality of section sections, a single second section having a relatively high data rate or in which a total number of terminals having the data rate to be controlled is minimized.

For example, when 'data rate of 2' and 'data rate of 3' are available in the second section and sizes of data rates are in order of 'data rate of 2'>'data rate of 3', a target terminal may be preferentially determined among terminals using the data rate of 2. When a target terminal is further selectable from among the optimal number of terminals of the first section, the target terminal may be selected from among terminals using the data rate of 3.

Also, when the number of terminals using the data rate of 2 is less than the optimal number of terminals by determining two target terminals among the terminals using the data rate of 2, and the number of terminals using the data rate of 3 reaches the optimal number of terminals by determining two target terminals among the terminals using the data rate of 3, the processing 230 may determine the target terminal among a more number of remaining terminals, that is, the terminals using the data rate of 3, and may minimize the number of terminals of which the data rate is to be controlled in terms of the overall network.

Here, when the processing 230 controls all of the terminals selected in the second section to use the first section, the number of terminals for the first section exceeds the optimal number of terminals for the first section, which may lead to increasing a collision probability. Accordingly, a portion of terminals may be reselected as the target terminal within the optimal number of terminals for the first selection based on a control criterion.

The control criterion may be determined by a manager based on, for example, a statistical value of an SNR or a data rate required by a terminal.

In detail, when the number of selected terminals exceeds, that is, is greater than n and the 'SNR of the terminal' is selected by the operator as the control criterion, the processing 230 may reselect the n or less number of terminals based on a statistical value of an SNR identified from the database 250 and may determine the reselected n or less number of terminals as the target terminal.

That is, the processing 230 may select a terminal including the first section as the available data rate range from among terminals counted in the second section, may sort the selected number of terminals based on an average SNR, may reselect the n or less number of terminals in descending order of the average SNR, and may determine the reselected n or less number of terminals as the target terminal of which the data rate is to be changed with the first section.

In this case, the processing 230 may preferentially increase a data rate of a terminal having relatively excellent connection quality (link state) with the gateway.

Also, when the selected number of terminals exceeds, that is, is greater than n and the 'required data rate of the terminal' is selected by the manager as the control criterion, the processing 230 may reselect the n or less number of terminals in descending order of the required data rate and may determine the reselected or less number of terminals as the target terminal.

Here, the 'required data rate of the terminal' may be set based on, for example, a service using data transmitted from the terminal. For example, when an amount of water used is included in data transmitted from the terminal, for example, a water meter, the processing 230 may verify a data rate that is set according to a water usage amount guide service, as the required data rate of the terminal. Also, when a position value is included in data transmitted from the terminal, for example, a pet position tracker, the processing 230 may verify a data rate that is set according to a pet position tracking service, as the required data rate of the terminal. Alternatively, a required data rate value of the terminal may be included in data transmitted from the terminal.

That is, the processing 230 may select a terminal including the first section as the available data rate range from among the terminals counted in the second section, may sort the selected terminals based on the required data rate, may reselect the n or less number of terminals in descending order of the required data rate, and may determine the reselected n or less number of terminals as the target terminal of which the data rate is to be changed with the first section.

In this case, the processing 230 may determine a terminal requiring a relatively high data rate as the target terminal of which the data rate is preferentially controlled to increase.

Also, when the number of selected terminals exceeds n, the processing 230 may reselect the n or less number of terminals in descending order of a sufficient data rate and may determine the reselected n or less number of terminals as the target terminal.

That is, the processing 230 may reselect the n or less number of terminals in descending order of a difference between a current data rate and a maximum data rate of the available data rate range and may determine the reselected n or less number of terminals as the target terminal of which the data rate is to be changed with the first section.

In this case, the processing 230 may preferentially increase a data rate of a terminal that is currently using a relatively low data rate although the terminal is capable of using a further higher data rate.

As described above, the processing 230 may determine the target terminal of which the data rate is to be changed in descending order of the required data rate or the statistical value of the SNR, such that the data rate control may be performed based on the overall network information such as connection quality and an application service provided to each terminal.

With respect to a terminal exceeding the n terminals among the selected terminals, the processing 230 may maintain a data rate of the corresponding terminal instead of changing the data rate with the first section, and may maintain the number of terminals using the first section within the optimal number of terminals. Accordingly, it is possible to avoid a collision issue between terminals using the same first section.

That is, the processing 230 may increase a data rate of a terminal using the second section, based on the first section and, in this instance, may select a portion of terminals using the second section as the target terminal not to exceed the optimal number of terminals allocated to the first section.

That is, to enhance the overall network throughput, the processing 230 may increase data rates of some terminals using the second section to be the first section within the optimal number of terminals using the first section, instead of increasing data rates of all of the terminals using the second section to be the first section. Accordingly, it may be possible to prevent a collision between terminals using the first section.

According to example embodiments, it is possible to verify the number of terminals using the same data rate with respect to the entire terminals present in a network, and to optimize a data rate of each terminal such that the overall network throughput may be maximized based on a collision probability.

The processing 230 may request an increase in a data rate if there is a need to increase the data rate in order to enhance the overall network throughput.

In detail, when the counter 220 counts the number of first terminals having a data rate less than a maximum value in the assigned available data rate range and when the counted number of first terminals reaches a desired number, the processing 230 may generate a data rate control request and may determine the target terminal among terminals including the counted number of first terminals based on the overall network information.

That is, when the number of first terminals capable of using a data rate higher than a current data rate reaches a desired number, the processing 230 may determine that a current overall network throughput is not a maximum value and may generate a data rate control request for increasing the overall network throughput.

In this case, to maximize the overall network throughput, the processing 230 may not determine all of the first terminals as target terminals of which data rates are controlled to increase and may analyze information of the entire terminals present in the network and may determine a portion of the first terminals as target terminals to prevent a terminal distribution from being concentrated in a specific section. That is, the processing 230 may determine the number of target terminals within the optimal number of terminals for each section capable of maximizing the overall network throughput based on the collision probability.

According to another example embodiment, using the collector 210, the processing 230 may monitor a current data rate of each terminal and connection with a new terminal and a disconnection from an existing terminal at desired intervals. When a specific section in which terminals are concentratively distributed and thus, a collision is predicted is verified, the processing 230 may generate a data rate control request to disperse terminals using the corresponding specific section.

In detail, when the number of new terminals greater than or equal to a desired threshold are connected to the network through the gateway, the processing 230 may generate the data rate control request, may recount the number of terminals for each section based on a data rate of the new terminal, and may determine the target terminal of which the data rate is controlled to increase or decrease within the optimal number of terminals for each section by referring to an available data rate range of each terminal with respect to a section in which the recounted number of terminals for each section and the optimal number of terminals for each section do not match.

That is, when a relatively large number of new terminals are connected to the network through the gateway at a time, a collision may occur in a data rate section due to the new terminals. In this case, the processing 230 may generate the data rate control request and may control a data rate of an existing terminal based on a data rate of a new terminal.

That is, when a section in which the counted number of terminals exceeds the optimal number of terminals is verified due to the counted new terminal, the processing 230 may verify an available data rate range of an existing terminal corresponding to the section, may select a terminal of which a data rate is controlled to increase or decrease, and may determine the selected terminal as the target terminal.

In this case, the processing 230 may receive a periodical signal from a terminal present within communication coverage of the gateway, may verify the number of terminals, connection quality of each terminal, and a current data rate thereof, and may appropriately disperse terminals using a section in which terminals are concentratively distributed. In this manner, it is possible to increase the data rate and to reduce a collision probability.

FIG. 3 illustrates an example of controlling a data rate in an adaptive data rate control system according to an example embodiment.

Referring to FIG. 3, a data rate control system according to an example embodiment may allocate, as '4' for a first section (data rate of 1) and '3' for a second section (data rate of 2), respectively, the optimal number of terminals for each section capable of maximizing a collision-based overall network throughput based on an optimization scheme with respect to a total of seven terminals connected to a LoRa network.

The data rate control system may control a data rate of each terminal within the optimal number of terminals for each section.

In detail, the data rate control system may verify the data rate of each terminal, may count the number of terminals for each section corresponding to the data rate, and may compare the counted number of terminals to the optimal number of terminals.

Referring to FIG. 3, when it is verified that two terminals are using the first section (data rate of 1) and five terminals are using the second section (data rate of 2) of which the data rate is less than that of the first section, the data rate control system may determine that the number of terminals using the second section exceeds the optimal number of terminals and a collision occurs and may generate a data rate control request.

Also, to enhance an overall network throughput by increasing the data rate of each terminal, the data rate control system may generate the data rate control request. When the number of new terminals greater than or equal to a desired threshold are connected to the network, the data rate control system may generate the data rate control request.

In response to generating the data rate control request, the data rate control system may select terminals, for example, terminals 3, 4, and 5, capable of using the first section by referring to the available data rate range of five terminals using the second section. Here, the optimal number of terminals for the first section is '4' and the number of terminals using the first section is '2'. Therefore, the data rate control system may reselect two terminals from among the terminals 3, 4, and 5 to maintain the optimal number of terminals in the first section after the data rate control.

When a statistical value of SNR is selected as a data rate control criterion, the data rate control system may reselect two terminals, for example, terminals 3 and 5, from among the terminals 3, 4, and 5 in descending order of statistical value of SNR and may determine the selected terminals 3 and 5 as target terminals.

Also, when a required data rate of a terminal is selected as the data rate control criterion, the data rate control system may determine the target terminal by preferentially applying the required data rate rather than applying the statistical value of the SNR.

That is, the data rate control system may identify the required data rate of the terminal from data transmitted from the terminal or set the required data rate based on a type of an application service, and may reselect two terminals 4 and 5 in descending order of the required data rate and determine the reselected two terminals 4 and 5 as target terminals, and may change the data rates of the target terminals from the second section to the first section.

In this case, the data rate control system may maintain the terminal 3 to use the second section as is although the terminal 3 is capable of using the first section, and accordingly may maintain the number of terminals using the first section to be within the optimal number of terminals ('4').

As described above, the data rate control system may maximize the overall network throughput by increasing the data rate based on the collision probability.

Figure 4:
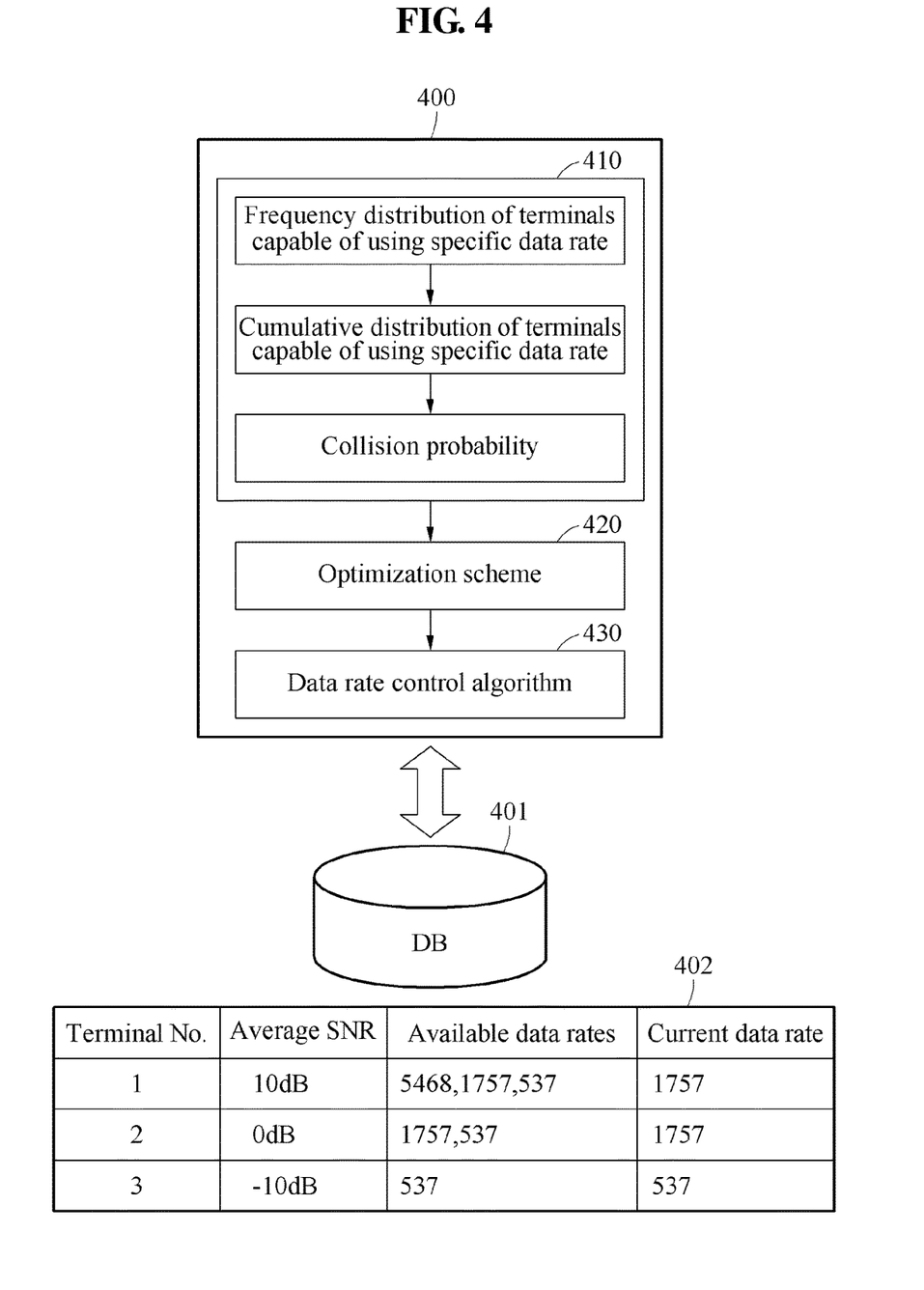
FIG. 4 illustrates an example of controlling a data rate based on collected terminal information in an adaptive data rate control system according to an example embodiment.

FIG. 4 illustrates an example of controlling a data rate based on collected terminal information in an adaptive data rate control system according to an example embodiment.

Referring to FIG. 4, a data rate control system 400 may store, in a database 401, an average SNR, a current data rate, and an available data rate range of each terminal based on data received through a gateway.

Referring to a box 410, the data rate control system 400 may verify a frequency distribution and a cumulative distribution of terminals capable of using a specific data rate and may determine a collision probability through comparison.

For example, the data rate control system 400 may determine that a collision occurs when the number of new terminals greater than or equal to a desired threshold are connected to a network.

The data rate control system 400 may derive a combination for the number of terminals using a specific section among a plurality of sections to maximize an overall network throughput by applying an optimization scheme 420 based on terminal information 402 that is maintained in the database 401, and may allocate the optimal number of terminals for each terminal based on the combination.

That is, the data rate control system 400 may derive the number of terminals using each data rate for maximizing the overall network throughput as the optimization scheme 420.

In detail, the data rate control system 400 may define the overall throughput as an objective function for the number of terminals using a specific data rate and may derive the number of terminals using the specific data rate for maximizing the overall network throughput. For example, the optimization scheme 420 may be a Lagrange multiplier method, a slope descent method, and a dual problem and descent projection method.

The data rate control system 400 may control a data rate of a target terminal that is determined based on a data rate control algorithm 430 to be within the optimal number of terminals for each section. Hereinafter, a process of determining the target terminal based on the data rate control algorithm 430 will be described with reference to FIG. 5.

Figure 5:
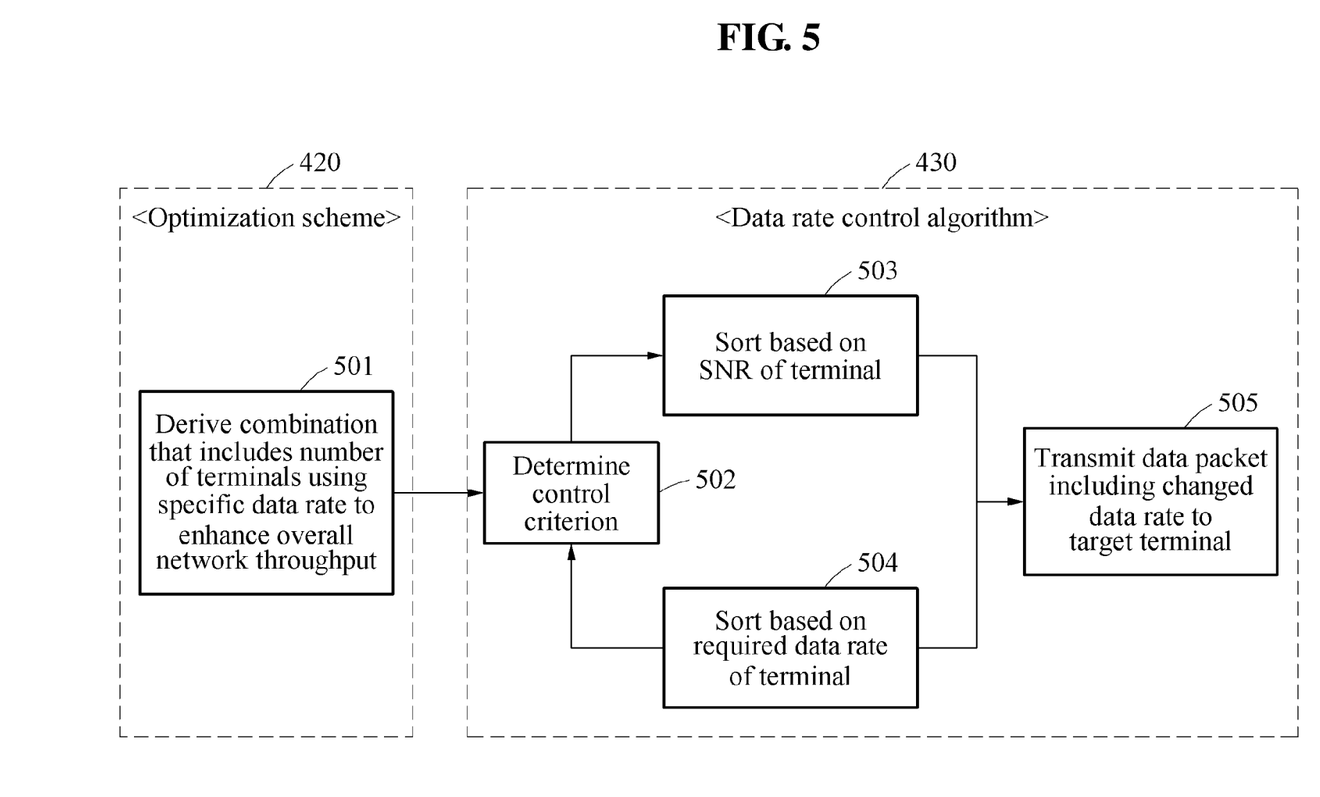
FIG. 5 illustrates an example of a data rate control algorithm applied in an adaptive data rate control system according to an example embodiment.

FIG. 5 illustrates an example of a data rate control algorithm applied in an adaptive data rate control system according to an example embodiment.

Referring to FIG. 5, in operation 501, a data rate control system according to an example embodiment may derive a set (combination) that includes the number of terminals using a specific data rate to enhance an overall network throughput based on the optimization scheme 420, and may determine a target terminal of which a data rate is to be controlled within the optimal number of terminals for each section allocated based on the combination, based on the data rate control algorithm 430.

In detail, the data rate control system may determine a target terminal based on a control criterion determined by a manager in operation 502. The control criterion may be, for example, a statistical value of an SNR or a required data rate of a terminal.

When an 'SNR of a terminal' is selected by the manager as the control criterion in operation 502, the data rate control system may sort terminals based on a statistical value of an SNR identified from a database and may determine the number of terminals as target terminals in descending order of the statistical value of the SNR in operation 504. In this case, the data rate control system may preferentially increase a data rate of a terminal having excellent connection quality (link state) with a gateway.

Alternatively, when a 'required data rate of a terminal' is selected by the manager as the control criterion in operation 502, the data rate control system may sort terminals based on the required data rate and may determine the number of terminals as target terminals in descending order of the required data rate in operation 503. In this case, the data rate control system may preferentially increase a data rate of a terminal requiring a fast processing depending on a type of an application service.

In operation 505, the data rate control system may transmit a command packet including a changed data rate to the target terminal of which the data rate is to be changed through the gateway, and thereby increase the data rate of the target terminal.

Hereinafter, an operation of the data rate control system 200 according to example embodiments will be described with reference to FIG. 6.

Figure 6:
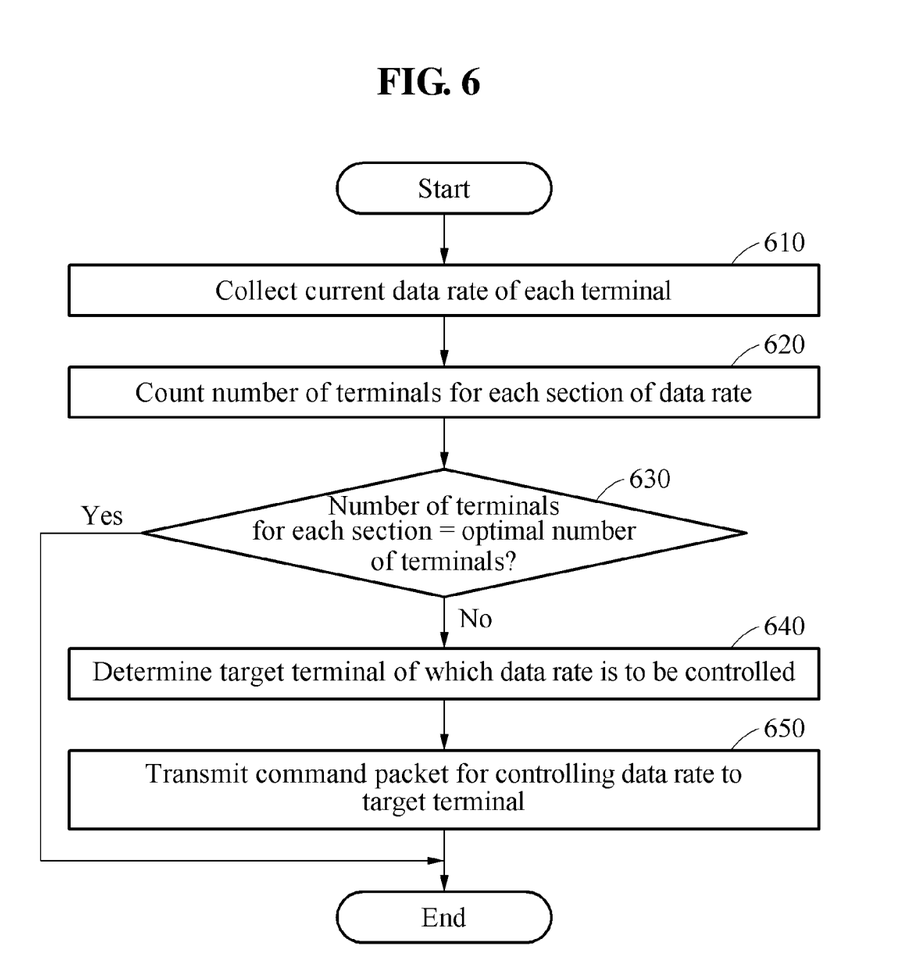
FIG. 6 is a flowchart illustrating an example of an adaptive data rate control method according to an example embodiment.

FIG. 6 is a flowchart illustrating an example of an adaptive data rate control method according to an example embodiment.

The adaptive data rate control method of FIG. 6 may be performed by the aforementioned data rate control system 200.

Referring to FIG. 6, in operation 610, the data rate control system 200 collects a data rate used by each of terminals connected to a network through a gateway.

Here, the terminal may be a sensor terminal configured to periodically transmit sensing data to the gateway that is connected to a LoRa network. The data rate control system 200 may collect a current data rate of each terminal from a packet header in data that is transmitted from each terminal to the gateway.

In operations 620 and 630, the data rate control system 200 counts the number of terminals for each section of the data rate and compares the counted number of terminals for each section to the optimal number of terminals that are allocated to a corresponding section based on an overall network throughput.

The data rate control system 200 may derive a combination for the number of terminals using a specific section to maximize the network throughput by defining the overall network throughput as an objective function for the number of terminals using the specific section and by applying at least one of a Lagrange multiplier method, a slope descent method, and a dual problem and descent projection method as an optimization scheme, and may allocate the optimal number of terminals for each section corresponding to a data rate based on the derived combination.

That is, the optimal number of terminals for each section may indicate the number of terminals for each section in the case of maximizing the overall network throughput by considering a collision probability based on the number of terminals simultaneously using the corresponding section.

That is, the data rate control system 200 may verify the collision probability by counting the number of terminals for each section based on a current data rate with respect to the entire terminals connected to the network through a single gateway and by verifying whether the counted number of terminals and the optimal number of terminals for each section match through comparison.

When they match in operation 630, the data rate control system 200 is terminated without transmitting a command packet for controlling a data rate.

On the contrary, when they do not match in operation 630, the data rate control system 200 determines a terminal included in a mismatch section as a result of the comparing, as a target terminal of which the data rate is to be controlled in operation 640.

In operation 650, the data rate control system 200 transmits the command packet for controlling a data rate to the target terminal through the gateway.

That is, when the counted number of terminals exceeds the optimal number of terminals for the first section and accordingly, a collision is predicted, the data rate control system 200 may determine the target terminal of which the data rate is to be controlled within the optimal number of terminals for each section and may transmit the command packet that includes the changed data rate to the target terminal through the gateway, thereby increasing the data rate.

As described above, the data rate control system 200 may prevent a collision by a data rate control by increasing the data rate within the optimal number of terminals for each section to maximize the overall network throughput based on the collision probability.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An adaptive data rate control method comprising:
   collecting a data rate used by each of terminals connected to a network through a gateway;
   counting the number of terminals for each section of the data rate;
   comparing the counted number of terminals for each section to an optimal number of terminals that are allocated to a corresponding section based on an overall network throughput;
   determining a terminal included in a mismatch section as a result of the comparing, as a target terminal of which the data rate is to be controlled; and
   transmitting a command packet for controlling the data rate to the target terminal through the gateway,
   wherein, when the number of terminals counted in a first section among a plurality of sections is less by n than the optimal number of terminals allocated to the first section where n denotes a natural number of 1 or more, the determining as the target terminal comprises:
   selecting a terminal including the first section as an available data rate range from among terminals counted in a second section of which the data rate is less than that of the first section; and
   determining the n or less number of terminals among the selected terminals as the target terminal.

2. The adaptive data rate control method of claim 1, wherein, when the number of selected terminals is greater than n, the determining as the target terminal further comprises reselecting the n or less number of terminals based on a statistical value of a signal-to-noise ratio (SNR) identified from a database and determining the reselected n or less number of terminals as the target terminal.

3. The adaptive data rate control method of claim 1, wherein, when the number of selected terminals is greater than n, the determining as the target terminal further comprises reselecting the n or less number of terminals based on a data rate required by each terminal and determining the reselected n or less number of terminals as the target terminal.

4. The adaptive data rate control method of claim 1, wherein, when a plurality of second sections is present, the determining as the target terminal further comprises selecting, from among the plurality of section sections, a single second section having a relatively high data rate or in which a total number of terminals having the data rate to be controlled is minimized.

5. The adaptive data rate control method of claim 1, wherein the transmitting of the command packet comprises transmitting the command packet for increasing a data rate of the target terminal to be an average data rate of terminals included in the first section.

6. The adaptive data rate control method of claim 1, further comprising:
   measuring an SNR of each terminal through the gateway;
   assigning an available data rate range to each terminal based on a statistical value of the SNR;
   maintaining, in a database, terminal information that includes at least one of the data rate, the statistical value of the SNR, and the available data rate range; and reading the terminal information from the database, deriving a combination for the number of terminals using a specific section among a plurality of sections to maximize an overall network throughput based on an optimization scheme, and allocating the optimal number of terminals for each section based on the combination.

7. The adaptive data rate control method of claim 6, wherein the assigning comprises assigning, as the available data rate range, a lowest data rate among assignable data rates with respect to a terminal having the statistical value of the SNR less than a reference value.

8. The adaptive data rate control method of claim 6, further comprising:
counting the number of first terminals having the data rate less than a maximum value in the assigned available data rate range;
generating a data rate control request when the number of first terminals reaches a desired number; and
determining the target terminal among terminals including the counted number of first terminals, based on the overall network information.

9. The adaptive data rate control method of claim 6, further comprising:
generating a data rate control request when the number of new terminals greater than or equal to a desired threshold are connected to the network through the gateway; and
recounting the number of terminals for each section based on a data rate used by the new terminal; and
determining the target terminal of which the data rate is controlled to increase or decrease within the optimal number of terminals for each section by referring to an available data rate range of each terminal with respect to a section in which the recounted number of terminals for each section and the optimal number of terminals for each section do not match.

10. The adaptive data rate control method of claim 1, wherein the terminal is a sensor terminal configured to periodically transmit sensing data to the gateway that is connected to a LoRa network, and
the collecting of the data rate comprises collecting a current data rate of each terminal from a packet header in data that is transmitted from each terminal to the gateway.

11. An adaptive data rate control system comprising:
a collector configured to collect a data rate used by each of terminals connected to a network through a gateway;
a counter configured to count the number of terminals for each section of the data rate, and to compare the counted number of terminals for each section to and optimal number of terminals that are allocated to a corresponding section based on an overall network throughput; and
a processing configured to determine a terminal included in a mismatch section as a result of the comparing, as a target terminal of which the data rate is to be controlled, and to transmit a command packet for controlling the data rate to the target terminal through the gateway,
wherein, when the number of terminals counted in a first section among a plurality of sections is less by n than the optimal number of terminals allocated to the first section where n denotes a natural number of 1 or more, the processing is configured to select a terminal including the first section as an available data rate range from among terminals counted in a second section of which the data rate is less than that of the first section, and to determine the n or less number of terminals among the selected terminals as the target terminal.

12. The adaptive data rate control system of claim 11, wherein, when the number of selected terminals is greater than n, the processing is configured to reselect the n or less number of terminals based on a statistical value of a signal-to-noise ratio (SNR) identified from a database and to determine the reselected n or less number of terminals as the target terminal.

13. The adaptive data rate control system of claim 11, wherein, when the number of selected terminals is greater than n, the processing is configured to reselect the n or less number of terminals based on a data rate required by each terminal and to determine the reselected n or less number of terminals as the target terminal.

14. The adaptive data rate control system of claim 11, further comprising:
an allocator configured to read, from a database, terminal information that includes at least one of a statistical value of a signal-to-noise ratio (SNR) of each terminal, connection quality, and an available data rate range, to derive a combination for the number of terminals using a specific section among a plurality sections to maximize an overall network throughput based on an optimization scheme, and to allocate the optimal number of terminals for each section based on the combination.

\* \* \* \* \*